INVENTOR.
Harold Richard Yoder
BY
Paul + Paul
ATTORNEYS.

Nov. 25, 1969  H. R. YODER  3,479,772
SWELL SANDER

Filed Oct. 30, 1968  6 Sheets-Sheet 3

INVENTOR.
Harold Richard Yoder
BY
Paul + Paul
ATTORNEYS.

Nov. 25, 1969　　　H. R. YODER　　　3,479,772
SWELL SANDER

Filed Oct. 30, 1968　　　　　　　　　　　6 Sheets-Sheet 4

INVENTOR.
Harold Richard Yoder
BY
Paul + Paul
ATTORNEYS.

Nov. 25, 1969  H. R. YODER  3,479,772
SWELL SANDER
Filed Oct. 30, 1968  6 Sheets-Sheet 2

INVENTOR.
Harold Richard Yoder
BY
Paul + Paul
ATTORNEYS.

INVENTOR.
Harold Richard Yoder
BY
Paul & Paul
ATTORNEYS.

United States Patent Office 3,479,772
Patented Nov. 25, 1969

3,479,772
SWELL SANDER
Harold R. Yoder, Bechtelsville, Pa., assignor to Boyertown Burial Casket Company, Boyertown, Pa., a corporation of Pennsylvania
Filed Oct. 30, 1968, Ser. No. 771,814
Int. Cl. B24b 21/02
U.S. Cl. 51—145　　　　　　　　　　　　　10 Claims

ABSTRACT OF THE DISCLOSURE

A machine for sanding a large wooden surface in the form of a segment of a cylinder includes a rotatable carriage mounted in a frame. The carriage has a plurality of work holding chucks each of which includes adjustable means for holding the work piece at the ends and the sides and each of which is radially adjustable. Mounted on the frame is a plurality of belt sanders which are movable toward and away from the carriage.

BACKGROUND OF THE INVENTION

This invention relates to automatic machinery for sanding wooden work pieces, and more particularly, to a sander for rough and finished sanding of wooden casket lids.

In the machinery art in general, there are abrading machines of the traveling type which incorporate a rotary work holder of the turret type. However, in the field of sanding casket lids where it is necessary to mount a large work piece accurately so that a true radius can be developed in one dimension along an extensive straight line in another dimension to produce a finished surface known as a swell, there are no automatic multi-position machines.

SUMMARY OF THE INVENTION

In this application I disclose a new and novel means for sanding the swell of a plurality of casket lids comprising a frame having a multi-station rotatable carriage mounted thereon and at least one sanding means disposed thereon to sand the work pieces held in the stations as the carriage rotates. In the most preferred embodiment of my invention, there are a plurality of sanding means each of which is adjustable toward and away from the carriage. Further the stations on the carriage each include means for clamping the work pieces accurately and positioning them radially.

Accordingly, an object of my invention is to provide a means for sanding a long work piece so as to develop thereon a true radius in one dimension and a straight line in a second dimension producing a finished surface which is substantially a segment of a cylinder.

Another object is to provide a means of the type described for sanding the swell portion of a casket lid and in particular for sanding a plurality of said lids automatically.

A further object of my invention it to provide means for sanding lids of the type described wherein both rough and finished cuts are made automatically.

These and other objects of the invention will become apparent from the following description with reference to the drawings.

DESCRIPTION OF THE PREFERRED EMBODIMENTS

Figure 1:
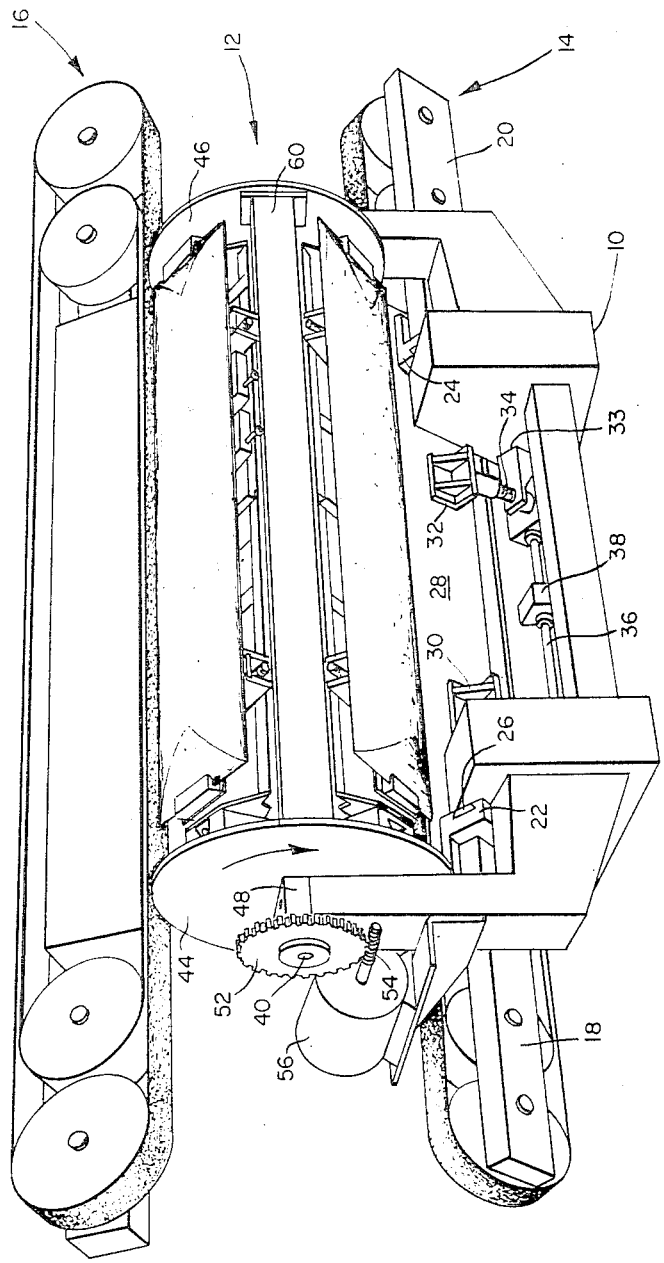
FIGURE 1 is a perspective view of a machine in accordance with the preferred embodiment of my invention with the work pieces shown mounted in the machine.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
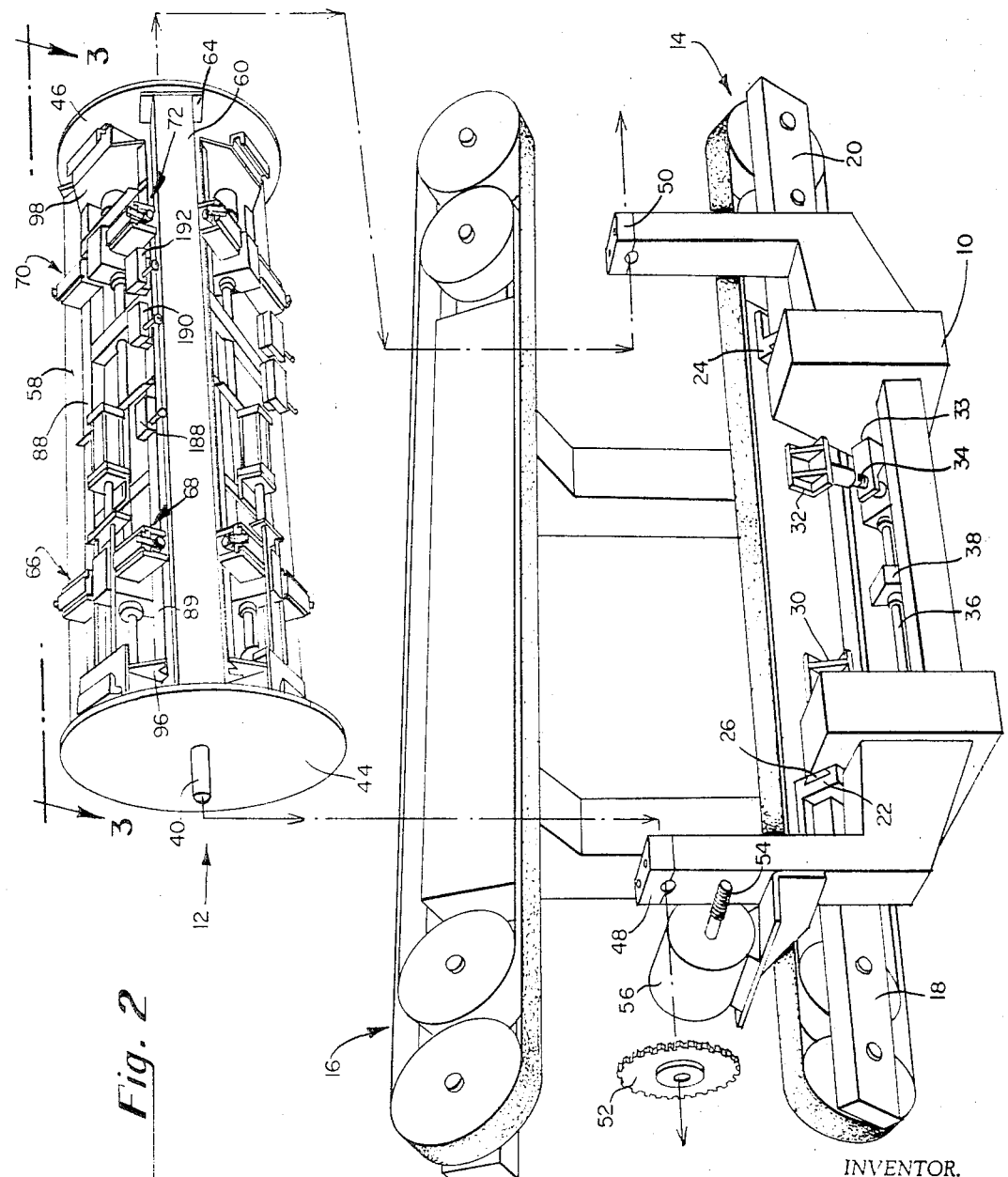
FIGURE 2 is a partial front elevation of the machine with the carriage oriented so as to be viewed as shown by the lines and arrows 3—3 in FIGURE 2 and with the frame shown in phantom.

Referring to FIGURES 1 and 2, the machine consists of a frame 10 which supports a carriage designated 12 and a plurality of sanding devices designated 14 and 16.

Before considering the carriage mechanism in detail, I will describe the frame and sanding units. The sanding units 14 and 16 are identical except that the grade of sanding material on the belts is different. As will be more fully explained hereinafter the preferred embodiment utilizes two belts, the first on unit 14 having a coarse grain and the second on unit 16 having a fine grain. Each belt is approximately 6 inches in width and 20 feet in total length. The mechanisms for driving the belts are standard purchased items available commercially and generally consist of rotating means for driving the belts mounted on a frame and connected to a source of power (not shown). For purposes of simplicity, I will describe the connection of only one of the belt units to the frame 10 of the sanding machine. The main frame of the belt unit consists of two beams 18 and 20 which support the rotating members. Each beam is cantilevered from a support bracket, as 22 and 24 respectively. The support brackets are connected by a main beam 28. Along one side of each of the support brackets there is formed a channel which is one member of a dovetailed slide. The mating member of the slide is fixedly attached to the frame 10 as at 26 so that the entire unit is supported on and can slide with respect to the frame 10. The slide is angled so that the plane of the surface of the sanding belt is perpendicular to the radius of the carriage and the leading edge of the belt is parallel to the central axis of the carriage. As more fully explained hereinafter, the central axis of the carriage is coincident with the axis of the trunnions 40 and 42.

To position the sanding unit, buttress blocks 30 and 32 are provided fixedly attached to the main beam 28. Each of the buttress blocks is connected by means of a screw jack, such as jack 34, to a common shaft 36. The jacks are fixedly mounted as at 33 to the frame 10 so that as the jack screw turns the action of the screw drives the unit up or down the slides. The common shaft 36 is connected by gear means to each of the jacks so that rotation of the shaft 36 causes simultaneous movement of the jacks. The shaft is rotated by means of an air motor 38 connected thereto which in turn is connected to a power source (not shown).

Thus upon an input signal to the motor 38 the common shaft 36 will rotate and drive both jacks so that the belt unit will move uniformly along the slides. The dovetailed slides greatly increases the accuracy of the motion of the belt unit. As will be more apparent from the following description it is necessary to position the belt accurately with respect to the work piece so that a straight line may be maintained on the surface of the work piece at a true radius along its entire length.

Figure 3:
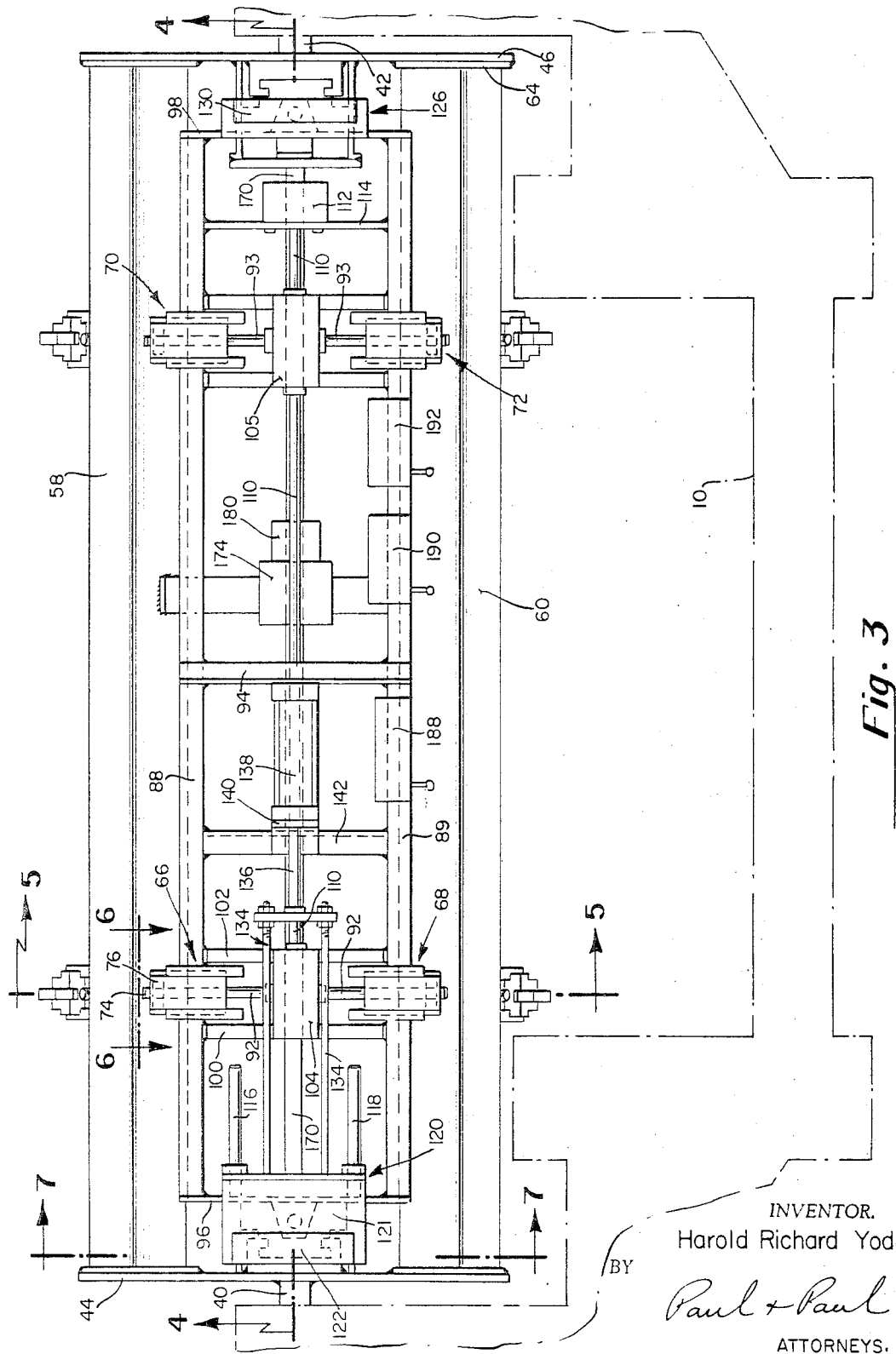

Referring now to the FIGURES 1 through 8, I will describe the carriage in detail. The overall carriage configuration is that of a cylinder supported axially on trunnions to rotate in frame 10. The trunnions 40 and 42 of FIGURE 3 are butt welded to the end plates 44 and 46 of the carriage, and are supported in bearings contained in bearing blocks 48 and 50 in the frame 10. Pinion 52 is fixedly mounted to trunnion 40 and meshes with worm gear 54 to rotate the carriage in the direction of the arrow (FIGURE 1) in response to rotation of the worm gear. The worm gear is directly driven by motor 56 which is mounted to frame 10.

Figure 7:
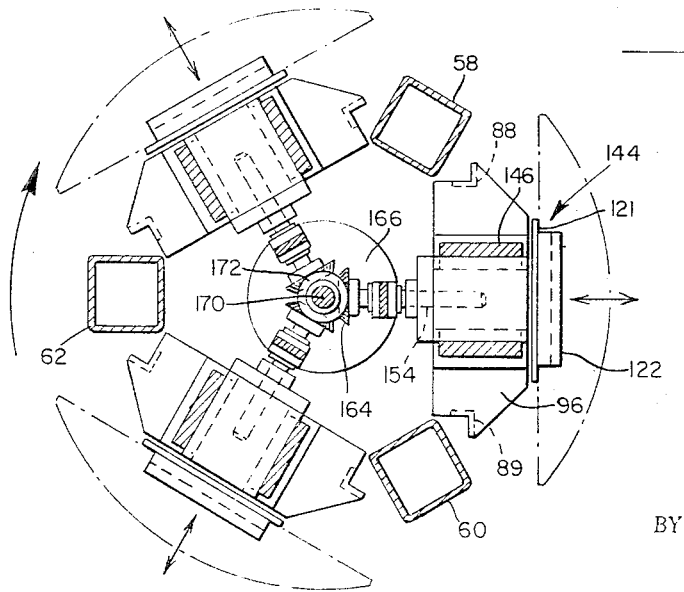
FIGURE 7 is a view taken as indicated by the lines and arrows 7—7 in FIGURE 3.

The end plates 44 and 46 are interconnected by three tubular beams each of which is substantially square in cross section as shown at 58, 60 and 62 in FIGURE 7. A mounting flange, such as 64 of FIGURE 2, is welded to each end of each beam. These mounting flanges are fixedly connected to the end plates by any suitable means, such as welding, thus providing a rigid, unitary structure having, as it axis of rotation, the axis of the trunnions 40 and 42.

The carriage supports a plurality of work pieces and rotates them automatically through various cutting positions so that a finished product is produced automatically. In the preferred embodiment three work pieces are mounted on the carriage at one time. For each work piece there is a mounting unit or station, and each mounting unit is substantially identical to the others. Accordingly, I will discuss in detail only one unit, that is, the unit shown in FIGURE 3. Each unit has three functions with respect to the work piece which are carried out by the following means: a lengthwise positioning and clamping means; a widthwise positioning means; and a radial positioning means.

The widthwise positioning means is shown in FIGURES 3–6 and comprises a plurality of adjustable edge clamps generally designated 66, 68, 70 and 72 in FIGURE 3. For purposes of simplifying the description I shall describe in detail only one clamp; it being understood that the others are of similar construction. Accordingly, each clamp has a clamp member 74 having an inwardly disposed flat edge to grip the work piece. The member 74 is relatively narrow on the order of one inch in the direction of the length of the work piece, since it is only necessary to contact the edge of the work piece and move it and it is desirable to do so without damaging the edge. At the same time it is desirable to provide a small area of surface contact, so that it will be easy to turn the clamp member 74 after it has moved the work piece into position. The clamp member 74 is attached to a slide block 76 by means of a thread stud 78; the threaded connection being such that the clamp member can be turned by hand and moved toward or away from the slide block. The edges of the slide block 76 are L shaped and the lips 80, 82 (FIGURE 6) engage corresponding grooves in the support brackets 84, 86 respectively. The support brackets are welded to a longitudinally extending angle bracket 88. Depending from the slide block 76 is flange 90 which is fixedly connected thereto by any suitable means such as by welding and is disposed in the space between the supports 84 and 86 and the angle 88. The flange 90 is in threaded engagement with one end of a threaded shaft 92. Rotation of the shaft 92 causes the slide block 76 to move with respect to the support brackets, sliding either forward or backward as the case may be.

As was previously stated, each of these clamp is constructed in the same fashion, so that it is convenient to have the oppositely disposed clamps on a common shaft. This also provides means whereby both clamps are moved either toward or away from each other on a single rotation of the shaft. The clamps are mounted on angles 88 and 89 which support the clamps and are part of a frame which includes stabilizing member 94 and end plates 96 and 98 all of which are connected to the angles by any suitable means, such as welding. Between the angles 88 and 89 there is a pair of angled web brackets 100 and 102 (compare FIGURES 3 and 5). These brackets are welded to the angles 88 and 89 at both ends thereof. The brackets act as supporting straps for the gear housing 104. A similar arrangement is provided for the other pair of edge clamps 70 and 72 and accordingly for the sake of simplicity I shall describe only one such arrangement. The gear housing 104 contains a pinion 106 which is keyed and fixedly connected to the shaft 92. The shaft itself is disposed in bearings (not shown) to support the shaft in the walls of the housing for rotation therein. A worm gear 108 engages the pinion 106 within the housing to cause the pinion to rotate in response to the rotation of the worm. The worm is mounted on a shaft 110 which is journaled in the housing 104 and extends along the length of the apparatus and is journaled at the other end in the gear housing 105. As can be seen, a similar worm and pinion arrangement is provided in this housing also. The shaft 110 passes through the housing 105 and is connected to an air motor 112 which is fixedly mounted to support web 114 (FIGURE 3). The support web is fixedly connected to a power source (not shown) so that upon actuation of the air motor the shaft 110 is rotated causing rotation of both the pinions in the housings 104 and 105, which inturn rotate their respective shafts 92 and 93 and cause the pairs of clamps 66–68 and 70–72 to move either toward or away from one another in the direction of the width of the work piece.

Thus in operation, the work piece is placed in position on the machine and the air motor is actuated. The clamps in each pair close simultaneously toward one another and make contact with the longitudinal edges of the work piece and move it to the correct position wherein the longitudinal axis of the work piece lies in the same plane as the axis of the carriage, insofar as this is practicable given the rough dimensions of the work piece. Once this alignment has taken place, the next step is to align and clamp the work piece in position axially. I shall now describe that portion of each station or mounting unit which accomplishes this end. The end plate 96 has a pair of parallel rods 116 and 118 extending inwardly therefrom and fixedly connected thereto. The rods serve as a support and guide means for the bracket designated 120; each rod passing through a reamed hole and boss on the downwardly extending legs of the bracket in sliding engagement therewith, so that the bed 121 of the bracket remains parallel to the axes rods 116 and 118 as it is moved axially. The bed 121 is a large flat plate which terminates at its outer end at an upwardly extending flange member having an inwardly extending portion 122. The bed itself is approximately 6 x 10 inches to provide a stable support for the work piece. The end flange and inwardly extending portion is approximately 2 x 2 x 7 inches and terminates in a beveled edge 124; the whole arrangement serving as a clamp and positioning means for the end of the work piece.

The opposite end of the work piece is held in a simpler clamp designated 126. This clamp also has a bed portion 128 and an angled flange 130 with a beveled edge 132. However, the bed is fixedly attached to the end plate 98. The bed 128 lies in the same plane as the bed 121; perpendicular to the radius of the carriage.

The work piece (shown in phantom in FIGURE 4) is positioned with one end disposed on the bed 128 and the other end disposed on the bed 121. In order to accurately position it and to clamp it, the bracket 120 is moved to the right when viewed as shown in the figure until it engages the work piece, thereby holding it in a clamped position between the clamps 120 and 126.

To move the bracket 120 I have provided a mechanical linkage designated 134 connected at one end to the downwardly disposed portion of the clamp 120 and at the other end to the piston rod 136 of a pneumatic piston and cylinder designated 138. The cylinder is fixedly attached to mounting brackets 94 and 140; bracket 140 being attached to bracket 142 which is fixedly connected to angles 88 and 89. The air connections to the double acting pneumatic piston-cylinder 138 are not shown, but are standard per se. In operation, air input signals cause the piston rod 136 to advance or retract thereby causing the mechanical linkage 134 to move bracket 120 on its rods 116 and 118 and either clamp or release the work piece.

By the means described thus far, the work piece is positioned with its longitudinal edges equidistant from the axis of the carriage.

Figure 4:
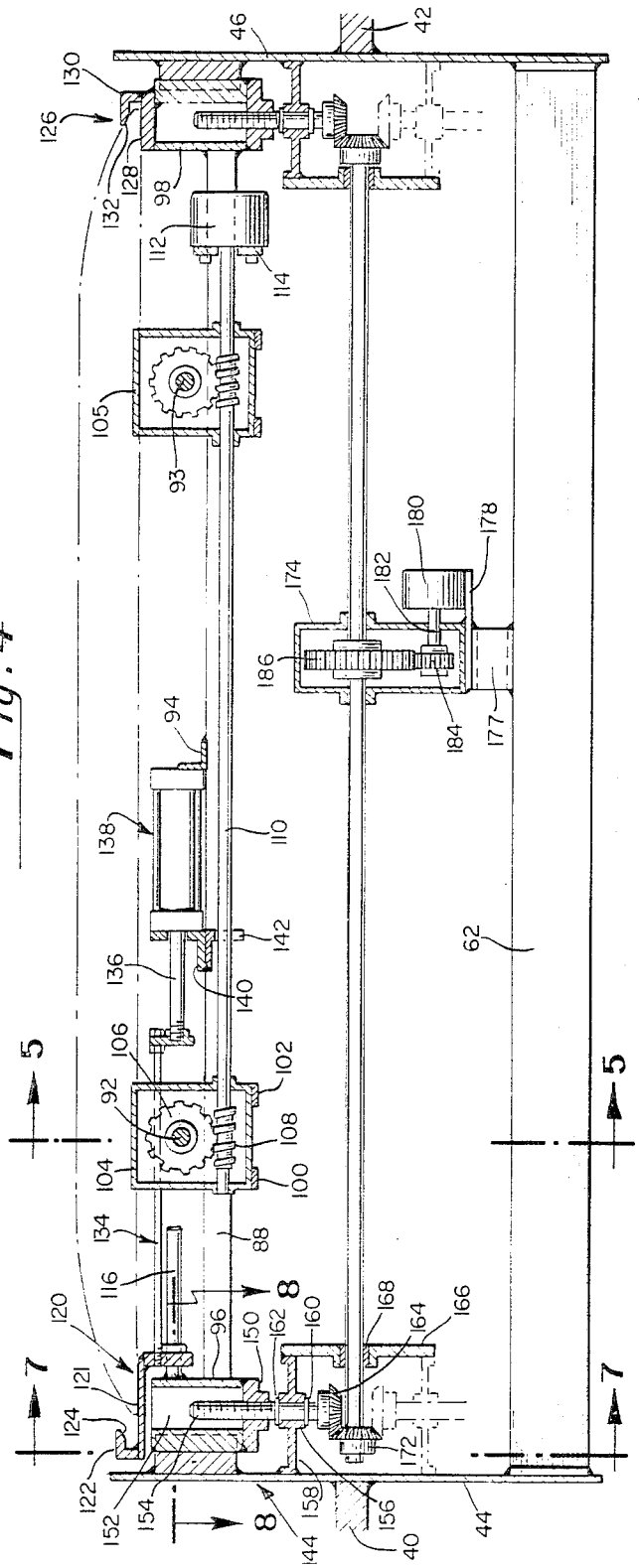
FIGURE 4 is a view taken as indicated by the lines and arrows 4—4 in FIGURE 3 showing only a portion of the machinery and an outline of the work piece in phantom.
Figure 6:
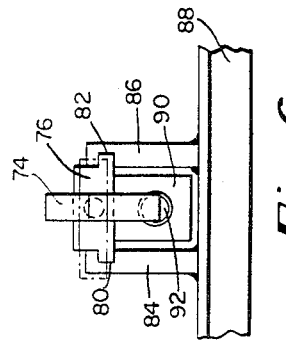
FIGURE 6 is a detailed view taken as indicated by the lines and arrows 6—6 in FIGURE 3.
Figure 8:
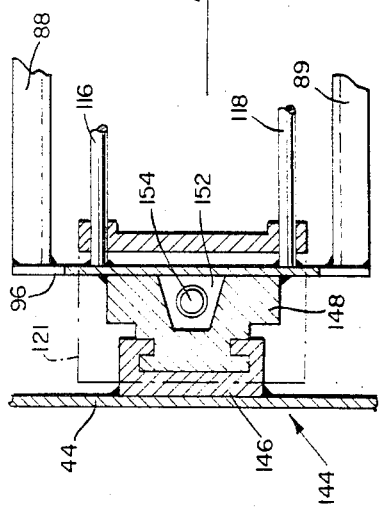
FIGURE 8 is a detailed view of a portion of the machinery taken as indicated by the lines and arrows 8—8 in FIGURE 4.

Note that both the edge clamps and the end clamps are mounted to a common structure which includes the end plates 96 and 98. These end plates are connected to an apparatus for moving the entire structure radially. Here again the apparatus connected to each end plate and the structure of which it is a part is substantially the same, the further a similar apparatus is connected to the structure of each station, so that for purpose of simplicity I will describe only one such apparatus, it being understood that the others have similar parts which function in a similar fashion. Referring then more particularly to FIGURES 4, 7 and 8, I shall describe in detail only the apparatus designated 144. This apparatus comprises a fixedly mounted channel member 146 which is welded to the end plate 44 so that the longitudinal axis of the channel extends radially from the central axis of the carriage. Mounted in sliding engagement with the channel member 146 is a slide member 148. The relatively long intricately interconnected bearing surfaces shown in the figures for the slide and channel members provides for accurate radial travel. The slide member terminates in a base portion 150 FIGURE 4 which is welded thereto. The base portion also supports the end plate 96 which is likewise welded thereto. The connections are such that the axes of the rods 116 and 118 are parallel to the axis of the carriage, and the bed 121 lies in a plane which is perpendicular to a radius of the carriage.

The slide 148 has a longitudinal channel 152 for clearance of the screw shaft 154 which is threaded through the base portion 150. The shaft 154 is mounted for rotation in a bearing housing 156 which is part of a support plate 158 which is fixedly connected to and extends inwardly from the end plate 44. The screw 154 is supported so that its axis is coincident with a radius of the carriage. C rings 160 and 162 are disposed in slots in the shaft 154 and allow the shaft to rotate while maintaining it in axial position with respect to the plate 158. The screw shaft 154 then extends downwardly and is fixedly connected to a bevel gear 164 for rotation therewith. The gear 164 is disposed in a gear housing shown partially in section and partially in phantom, which includes end plate 44 and support plate 158 and bearing plate 166.

The bearing plate 166 supports a bearing 168 which supports a main shaft 170. The shaft 170 has affixed to one end a bevel gear 172 which meshes with the bevel gear 164 (and with conplementary bevel gears shown in phantom) so that the bevel gears turn in response to the rotation of shaft 170. The main axis of the main shaft 170 is coincident with the axis of the carriage, that is, the common axis of the trunnions 40 and 42.

Figure 5:
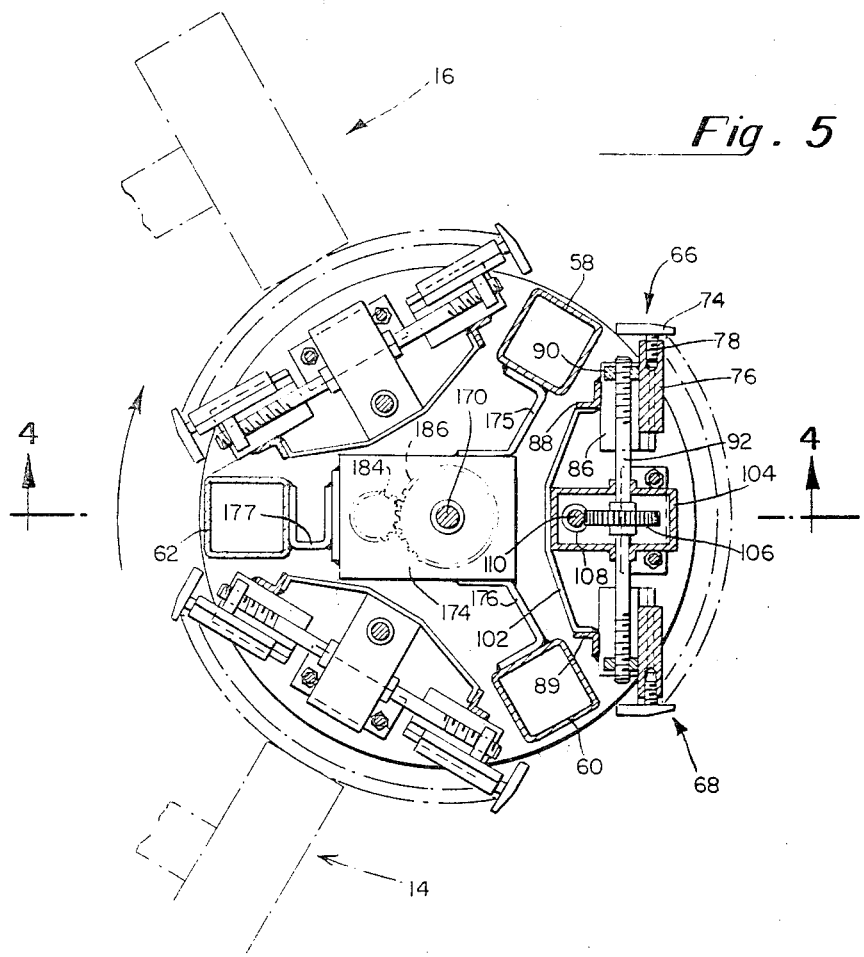
FIGURE 5 is a view taken as indicated by the lines and arrows 5—5 in FIGURE 3.

In addition to being supported in the gear boxes at either end, the shaft 170 is supported intermediate the ends thereof by bearings in the walls of gear box 174 which is fixedly mounted to the beams 58, 60 and 62 by U shaped brackets 175, 176 and 177 respectively as shown in FIGURES 5. Bracket 177 also supports base plate 178 (FIGURE 4) which extends between the bracket and gear box and supports air motor 180. The shaft 182 of the air motor is journaled in the housing 174 and has drive gear 184 mounted thereon. Drive gear 184 meshes with pinion 186 which is fixedly mounted on shaft 170. The air input means to the motor 180 are not shown for the sake of convenience since these are old and well known.

As previously stated the apparatus for radial adjustment is similar for each station on the machine and accordingly only one has been described. As shown in FIGURES 4 and 7 there are other such means all connected simultaneously to the drive shaft 170. Thus upon rotation of the drive shaft 170 both ends of each station supporting the work piece are moved radially simultaneously and uniformly. One slight difference might be pointed out and that is that the bed 128 is not only fixedly connected to the end plate 98 but also rests on and is preferably connected to the slide. This is not the case with bed 121, since this must be free to slide back and forth.

Figure 9:
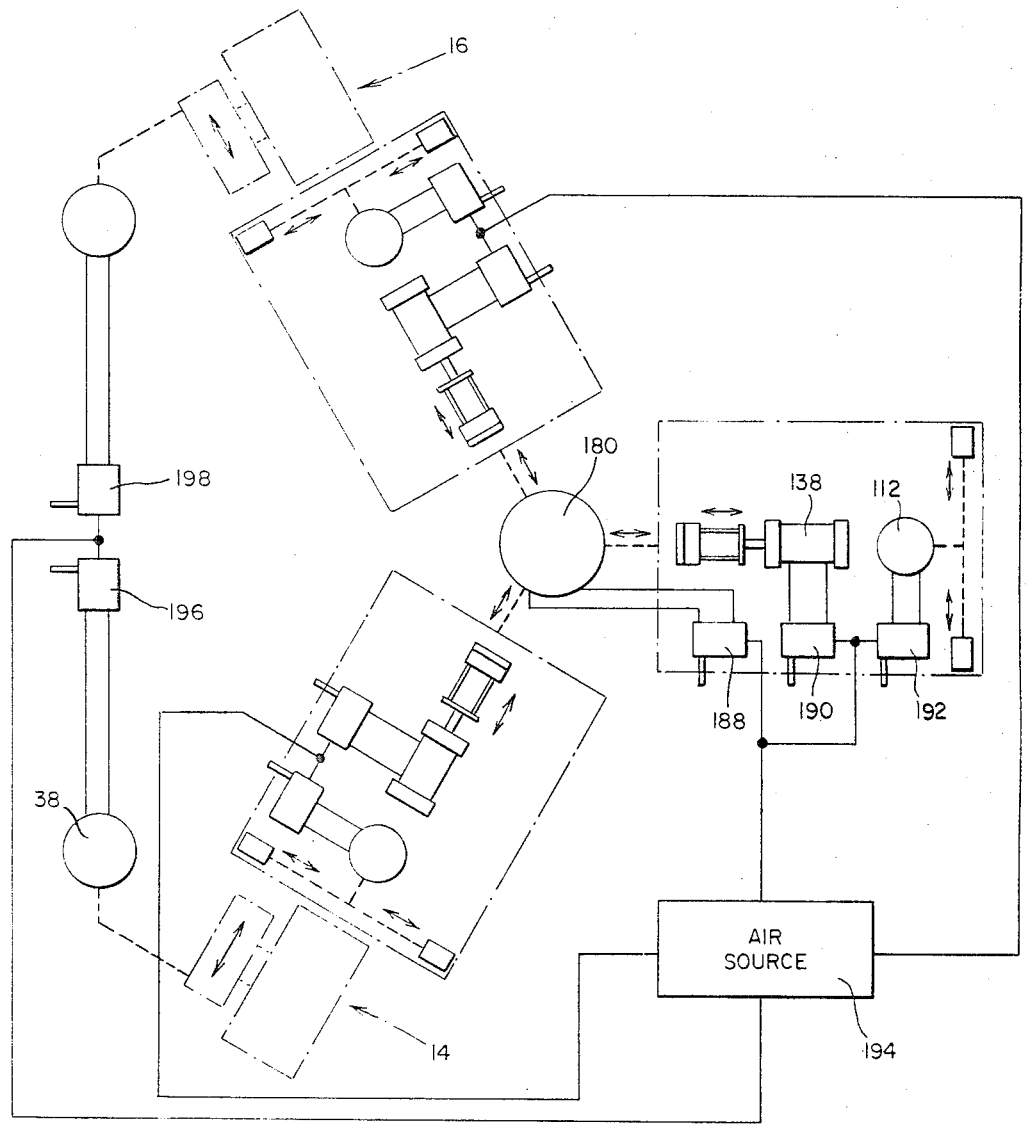
FIGURE 9 is a schematic view of the controls of the machinery.

Referring now to FIGURES 3 and 9, I shall describe the controls for the apparatus. FIGURE 3 shows three control boxes 188, 190 and 192 each of which is fixedly mounted to the angle 89 of the station frame. Each control box is actuated by a level shown extending therefrom. These control boxes correspond to the similarly numbered boxes shown schematically in FIGURE 9. All of the controls are run from a common air supply or supply or source 194 which supplies the air at a given pressure through pneumatic tubing or other similar means to the various boxes or controls all of which are known to those skilled in pneumatic machinery. Control boxes 190 and 192 control the lengthwise and widthwise clamps respectively, and each station has a similar set of these controls. Accordingly, only one set of such controls will be explained in detail. Control 188 controls the radial adjustment of the stations and only one such control is needed for all three stations. Control 192 is connected to air motor 112 FIGURE 4 by suitable conduit means to actuate the motor and drive the shaft 110, thereby moving the edge clamps 66, 68, 70 and 72 in or out to position the work piece.

Control 190 is connected by suitable conduit means to pneumatic piston and cylinder 138 and drives the piston to release or retract the clamp 120 to position and clamp the work piece from the ends.

Each station on the carriage has a similar set of controls for preforming similar functions independently of the other stations; all of the controls being standard, commercially available items.

However, only one control (188) is necessary for air motor 180, since actuation of this air motor actuates all three radial positioning means simultaneously. This control is connected by suitable conduit means to the air motor 180 as shown schematically in FIGURE 9.

A further set of controls is provided at 196 and 198 to position the lower and upper belts respectively. Control 196 is suitably connected both to the air source 194 and the air motor 38 for driving the motor and consequently positioning the belt sanding apparatus 14. In similar fashion control 198 controls the air motor for positioning belt sanding apparatus 16.

OPERATION

In operation a rough textured curved panel or work piece is placed on the beds of the end clamps of one station (such as beds 121, 128 FIGURE 4) and the side air clamps (such as 66, 68, 70 and 72) are actuated to center the piece. Next, the end clamps (120, 126) are actuated to move the piece longitudinally to its proper position and hold it there; at which point the side clamps are unscrewed ¼ turn so as to no longer grip the longitudinal edges of the work piece. Air motor 112 is then actuated to retract the clamps beneath the work piece so as to be clear of the belt sander. The machine is then indexed one position and the radial adjusting means is actuated to move the work piece so that the roughing belt 14 will engage the outer surface thereof to take a rough cut. Rotation of the machine is then begun by starting the motor 56 FIGURES 1 and 2 and a rough cut is made on the first piece. The machine is then stopped and again radially positioned until the desired depth of the rough cut is reached. An ammeter (not shown) on the control is used to indicate the proper belt pressure. The machine is then started again and rotation continued until the belt stops cutting.

A second panel is placed on the drum in the second station opposite to the direction of rotation of the carriage, and the machine is again turned on and rotated until once again the coarse belt has stopped cutting. The machine is then positioned so that the first piece is under the finishing belt 16 in the apparatus and the finishing belt is positioned by means of a control valve and control 198 until it touhces the work piece. The machine is rotated and once again the belt may be repositioned until the desired finishing cut has been made.

A further work piece is placed on the third station and now that the belts are in the proper positions, the machine will continue to rotate until each piece has been cut satisfactorily. It is not normally necessary, after the machine has once been set up, to readjust the belts. One simply has to replace the work pieces as they are finished. It is obvious that once the first set of work pieces is processed, it will be necessary and desirable to stop the machine only once during each third of a revolution to remove a finished work piece and put another one on.

In summary, for each revolution of the carriage, a work piece is placed on a first station, moved to a second position where it is rough cut, moved to a third position where it is finish cut, and moved back to the first position wherein it is removed and replaced by another work piece. The accurate slides and positioning means, make it possible to produce from a rough work piece an accurate finished swell on a casket lid, having a true radius in one direction along an extended line in another direction said line being in a plane perpendicular to the radius and being substantially along the longitudinal center line of the surface of the work piece.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A sanding apparatus comprising:
    (a) a frame having a multi-station carriage rotatably mounted thereon;
    (b) at least one sanding means mounted on said frame;
    (c) radially adjustable positioning means attached to each of said stations for radially positioning said stations;
    (d) means attached to said sanding means for radially adjustably positioning said sanding means with respect to the axis of rotation of said carriage; and
    (e) means on each of said stations for aligning and holding an oblong work piece including means for positioning the work piece so that the longitudinal axis of its outwardly disposed surface lies in the plane of and parallel to the axis of rotation of said carriage and means for mounting the work piece so that its longitudinal edges are substantially equidistant from said axis.

2. The invention of claim 1 wherein said sanding means includes a belt sander mounted so that the longitudinal cutting surface thereof faces said carriage and the intersection of the plane of said surface with a plane containing the axis of rotation of said carriage is a straight line parallel to said axis of rotation.

3. The invention of claim 2 wherein a second sanding means is provided having a belt sander mounted as is the first belt sander, and angularly displaced from said first sander about the axis of rotation of said carriage.

4. The invention of claim 1 wherein the means for aligning and holding said work piece includes means to engage the longitudinal edges of said work piece to adjust its position transversely and means to engage the ends of said work piece to hold said work piece on said station.

5. The invention of any one of claims 1, 2, 3, and 4 wherein said multi-station carriage has three stations thereon and said radial positioning means includes means attached to each of said stations for radially positioning the three stations simultaneously.

6. The invention of any one of claims 1, 2, 3, and 4 wherein the means for aligning and holding said oblong work piece includes means engaging the longitudinal edges of said work piece in a plurality of places along each edge transversely opposed to similar means along the opposite edge and movable transversely toward or away from said opposite means.

7. The invention of any one of claims 1, 2, 3, and 4 wherein the means for aligning and holding said oblong work piece includes means to engage the ends of said work piece comprising at least one clamp engaging each end of said work piece, at least one of said clamps being movable longitudinally toward and away from the other.

8. The invention of any one of claims 1, 2, 3, and 4 wherein the means for aligning and holding said oblong work piece include a pair of end clamps having flat beds thereon lying in the same plane perpendicular to the radius of the carriage, said clamps engaging the ends of said work piece while said work piece rests thereon.

9. The invention of any one of claims 1, 2, 3, and 4 wherein the means for aligning and holding said oblong work piece includes edge clamps engaging the longitudinal edges of said work piece at a plurality of places along each of said edges said clamps being disposed to oppose one another transversely along the longitudinal edges, and means connected to each of said clamps to move said clamps simultaneously in a transverse direction toward and away from each other and to retract said clamps beneath said work piece.

10. An apparatus for sanding a swell of a casket lid, comprising:
    (a) a frame;
    (b) a substantially cylindrical carriage supported in said frame on trunnions connected to the ends thereof for rotation about the common axis of said trunnions;
    (c) motor means attached to one of said trunnions for rotating said carriage;
    (d) a plurality of stations mounted on said carriage, each of said stations comprising a substantially rectangular frame having means connected to the ends thereof slidably engaging the ends of said carriage for radial movement with respect thereto;
    (e) means on each of said stations for aligning and holding an oblong work piece including means for positioning the work piece including means engaging the longitudinal edges of said work piece at a plurality of positions to adjust its position transversely and means to engage the end of said work piece to hold said work piece on said station which means includes a separate clamp mounted to each end of the frame of said station having a flat bed, said beds lying in a common plane perpendicular to the radius of said carriage, at least one of said clamps being adjustable longitudinally;

(f) a plurality of separate positioning means attached to the ends of the frames of each station for positioning the station radially with respect to the carriage and a common motor means connected to all of said positioning means simultaneously; and (g) sanding means disposed to engage the revolving surface of the work piece.

References Cited

UNITED STATES PATENTS

| | | |
|---|---|---|
| 1,259,125 | 3/1918 | Parker. |
| 2,406,728 | 8/1946 | Wharton _____ 51—145 |
| 2,682,285 | 6/1954 | Blum _____ 143—26 |

OTHER REFERENCES

| | | |
|---|---|---|
| 3,167 | 12/1863 | Great Britain. |
| 541,127 | 9/1955 | Belgium. |

OTHELL M. SIMPSON, Primary Examiner

U.S. Cl. X.R.

51—237; 143—171

UNITED STATES PATENT OFFICE
CERTIFICATE OF CORRECTION

Patent No. 3,479,772                          November 25, 1969

Harold R. Yoder

It is certified that error appears in the above identified patent and that said Letters Patent are hereby corrected as shown below:

Column 3, line 29, "it" should read -- its --; line 74, "clamp" should read -- clamps --. Column 5, line 26, "the further" should read -- and further --. Column 6, line 26, "level" should read -- lever --. Column 9, line 5, after "means" insert -- for adjusting said positioning means --.

Signed and sealed this 9th day of June 1970.

(SEAL)
Attest:

Edward M. Fletcher, Jr.                    WILLIAM E. SCHUYLER, JR.
Attesting Officer                         Commissioner of Patents